(12) United States Patent
Nolan et al.

(10) Patent No.: US 7,377,773 B2
(45) Date of Patent: May 27, 2008

(54) METHOD OF REDUCING $NO_x$ EMISSIONS IN ROTARY PREHEATER MINERAL KILNS

(75) Inventors: Paul S. Nolan, Fort Worth, TX (US); Robert F. Kohl, Scottsdale, AZ (US); Juergen Lauer, Maylene, AL (US); Kerry Seitz, Southlake, TX (US)

(73) Assignee: Chemical Lime Company, Fort Worth, TX (US)

( * ) Notice: Subject to any disclaimer, the term of this patent is extended or adjusted under 35 U.S.C. 154(b) by 36 days.

(21) Appl. No.: 11/498,558

(22) Filed: Aug. 3, 2006

(65) Prior Publication Data

US 2008/0032247 A1 Feb. 7, 2008

(51) Int. Cl.
*F27B 15/10* (2006.01)
(52) U.S. Cl. .......................... 432/14; 110/246
(58) Field of Classification Search ................. 432/14, 432/15, 18; 110/246, 342, 348
See application file for complete search history.

(56) References Cited

U.S. PATENT DOCUMENTS

| 4,564,505 A | 1/1986 | Alfrey | 422/209 |
|---|---|---|---|
| 5,766,544 A | 6/1998 | Kemp | 266/173 |
| 5,919,301 A | 7/1999 | Rother et al. | 106/761 |
| 6,544,032 B1 | 4/2003 | Brentrup | 432/14 |
| 6,733,283 B2 * | 5/2004 | Skaarup Jensen et al. | 432/14 |
| 2004/0115582 A1 | 6/2004 | Hansen et al. | 432/113 |
| 2006/0008757 A1 * | 1/2006 | Zamansky et al. | 432/18 |

FOREIGN PATENT DOCUMENTS

| EP | 0 854 339 | 8/1997 |
|---|---|---|
| GB | 2 203 671 | 10/1988 |

* cited by examiner

*Primary Examiner*—Gregory A Wilson
(74) *Attorney, Agent, or Firm*—Charles D. Gunter, Jr.

(57) ABSTRACT

This invention relates to a method to further enhance $NO_x$ reduction in rotary preheater mineral kilns by coupling the temperature control and gas composition uniformity afforded by the high temperature mixing with the use of chemical reducing agents. The chemical reducing agent or agents, generally chosen from ammonia or ammonia precursors, are introduced at a specific point in the rotary preheater kiln which has as an optimal temperature window to achieve the greatest reduction of $NO_x$ emissions.

9 Claims, 4 Drawing Sheets

METHOD OF REDUCING $NO_x$ EMISSIONS IN ROTARY PREHEATER MINERAL KILNS

BACKGROUND OF THE INVENTION

1. Field of the Invention

The present invention relates to a method for reducing $NO_x$ emissions from rotary preheater mineral kilns, and particularly from rotary preheater lime kilns, by coupling the temperature control and gas composition afforded by high temperature mixing systems with the injection of nitrogen containing chemical additives at a predetermined location and within an optimal temperature window.

2. Description of the Prior Art

A variety of mineral processing techniques utilizing high temperature kilns are known and commercially practiced at the present time. These commercial processes, particularly lime kiln processes, involve a number of different basic kiln designs and modifications thereto, diverse fuels and varying degrees of automation. Among the basic types of kilns employed for the production of lime in the United States at the present time are the straight rotary kiln, the rotary preheater kiln, and the vertical shaft kiln. In the conventional straight rotary kiln, a long straight cylindrical shaft is built on a slight incline. Limestone is charged into the kiln at the elevated end and advanced toward a flame at the lower end of the shaft where the limestone is calcined into quicklime and discharged. In addition, a flow of combustion gases that are derived from fuel injected at the lower end of the shaft move countercurrent to the downward flow of lime.

Vertical kiln designs may be the most widely employed designs in the world. There are hundreds of modifications to the basic vertical layout. However, all such designs tend to have four distinct zones: (1) a stone storage zone, which is a vertical or often a modified hopper-shaped zone; (2) a preheating zone, designed to heat the stone near dissociation temperatures; (3) a calcining zone, where combustion occurs; and (4) a cooling and discharge zone, usually shaped like an inverted, truncated cone, with the quicklime being discharged from the bottom of the cone.

The rotary preheater kiln design is an attempt to improve thermal efficiency in the overall limestone calcining operation. Shaft preheaters, which often resemble a vertical kiln looming above and astride the inlet end of a rotary kiln, have been the most frequently installed preheaters.

Whatever, the particular kiln design, undesirable gases, such as nitrogen oxide ($NO_x$), are produced during the heating and cooling processes that takes place inside the kiln. Growing concerns regarding health and environmental issues surrounding such emissions from combustion processes generally have given rise to several technologies developed to reduce $NO_x$ emissions. These technologies have been applied in a variety of different situations which extend far beyond the field of mineral calcining operations. In the case of unflued gas burners used in the home, for example, technologies such as the "Bowin low-$NO_x$ technology" are utilized, where air and fuel gas are premixed at a ratio greater than or equal to the stoichiometric combustion requirement. Other technologies, such as selective catalytic reduction and selective non catalytic reduction reduce post combustion $NO_x$ in a variety of different industrial settings. In the consumer arena, the so-called "catalytic converters" have been widely used in recent years on automobile engine exhausts to reduce $NO_x$ emissions.

In the industrial arena, there are current methods for reducing $NO_x$ emissions by injecting ammonia or ammonia precursors which have been used successfully in selective non catalytic reduction systems for control of $NO_x$ emissions from boilers in the power industry. However, their effectiveness is often limited by the extent to which flue gas temperature at the injection point remains within a relatively narrow temperature window, somewhere on the order of 1600° F.-2200° F. (871-1204° C.). Normal daily load variations in the industry will frequently drive the temperature out of this range. In contrast, such temperature excursions are far less frequent or as wide-ranging in mineral processing applications such as kilns used to produce quicklime.

Thus, the possibility of using ammonia injection to reduce $NO_x$ emissions seems to be a feasible approach for mineral processing kilns. However, both the straight rotary and vertical shaft kilns described above have an optimum temperature for the injection of the urea or ammonium which is located approximately in the middle of the kiln. This adds a degree of difficulty to the injection process and limits its usefulness as a $NO_x$ reduction technique for such kiln designs.

In addition to the injection of ammonia as a means of controlling $NO_x$ emissions in mineral processing kilns, another known technique utilized in rotary mineral kilns generally deals with the introduction of turbulent gases into the kiln interior. Controlled high temperature mixing of the gases within the kiln provides a means of reducing temperature and compositional stratification, resulting in more efficient heat transfer and improved fuel consumption within the kiln.

There is existing patent literature that provides an explanation of the technique of mixing high temperature gases in mineral processing kilns in order to reduce $NO_x$ emissions. For example, U.S. Pat. No. 6,672,865, issued Jan. 6, 2004, teaches the injection of air with high velocity/high kinetic energy into a mineral kiln to reduce or eliminate stratification of kiln gases and thereby further reduce $NO_x$ emissions. However, this reference does not teach the concept of further enhancing $NO_x$ reduction by coupling the temperature control and gas composition afforded by high temperature mixing with the use of ammonia or ammonia precursors which are introduced at a particular location in the process and within an optimal temperature window.

There are also known kiln arrangements for treating fine-grained material such as cement clinker in which exhaust air from the cooling zone is introduced in two branch air streams at different points into the calcination zone, the delivery of air and fuel being set in such a way that the section of the calcination zone which is operated under oxidizing conditions and which adjoins the section operated under reducing conditions. These technologies attempt to achieve a lowering of the basic level of $NO_x$ through a targeted adjustability of the reaction conditions in the calcination zone, particularly by the choice of an optimal temperature window and a favorable oxygen content. While these known technologies attempt to achieve targeted reaction conditions in the calcination zone, they do not appear to specifically be concerned with combining the high velocity/high kinetic energy air delivery with the injection of an ammonia additive.

Much in the same way, known techniques describe a fluid bed of particle material which is fluidized by the use of primary air and which may have a reducing agent further introduced into a combustion zone, along with the injection of secondary air, to suppress $NO_x$ emissions. These prior art techniques again teach adjusting the quantities of air supplied to the calcining or combustion chamber in stoichiometric fashion in order to provide either a reducing or oxidizing atmosphere. This does not necessarily equate to the use of high velocity/high kinetic energy air injection, however, and these existing technologies do not combine the use of nitrogen-containing chemical additives.

Despite the fact that various technologies have been developed to address the presence of $NO_x$ emissions in a variety of commercial and industrial settings, a need continues to exist for further improvements in lime kiln operations due to the nature of the combustion processes which take place inside a limestone kiln.

A need accordingly exists for a method to further enhance $NO_x$ reduction in rotary preheater limestone kilns and to overcome the other described problems with respect to the prior art, which improved method will become apparent to one skilled in the art from the detailed description provided below.

SUMMARY OF THE INVENTION

The present invention has as one object to combine the use of a high temperature mixing system of the type used in mineral processing kilns with the subsequent or concomitant injection of a nitrogen-containing chemical such as ammonia, urea, cyanuric acid or other ammonia precursors at appropriate stoichiometries within an optimum temperature range and at a preselected point or points within the calcining operation.

Another object of the present invention is to provide a further reduction in $NO_x$ emissions in the lime calcining industry, particularly in the case of limestone rotary preheater kilns.

The present invention provides an improved method of reducing $NO_x$ emissions in a rotary preheater limestone kiln having a feed zone, a preheat zone, a calcining zone and a cooling and discharge zone. In the preferred method of the invention, the kiln includes an inclined rotary vessel having an upper end and lower end, a preheating assembly positioned proximate to the upper end of the rotary vessel and a burner positioned proximate to a combustion air inlet at the lower end of the rotary vessel. A supply of limestone is first introduced into the feed zone. The limestone is then moved through the preheat zone having a predetermined preheat temperature range, to an upper end of the calcining zone where the limestone is heated to a temperature and for a time sufficient to convert the limestone to quicklime.

A nitrogen containing chemical additive, such as a source of ammonia or an ammonia precursor, is introduced at a point in the process where the kiln temperatures are within an optimum range to obtain the maximum $NO_x$ reduction with the minimum $NH_3$ slip. This point will generally be a point between the preheat zone and a primary region of the calcining zone at a predetermined optimum temperature point between the zones where the combustion gases from the calcining zone go into the preheater zone to heat up the limestone feed. The preferred optimum temperature point at which the chemical additive is introduced into the kiln is a point between the preheat zone and the calcining zone having a temperature in the range from about 1600 to 2200° F. In the case of ammonia or an ammonia precursor as the chemical additive, the additive is preferably provided as a dry powder which is blown into the kiln at the selected point or points through available ductwork.

The addition of the chemical additive is also coupled with the injection of turbulent air at a preselected point or points downstream of the preheat zone to reduce stratification of kiln gases and improve the energy efficiency of the kiln. The calcined limestone passes from the calcining zone to the cooling and discharge zone with the resulting quicklime product being discharged from the kiln.

Additional objects, features and advantages will be apparent in the written description which follows.

DETAILED DESCRIPTION OF THE INVENTION

Figure 1:
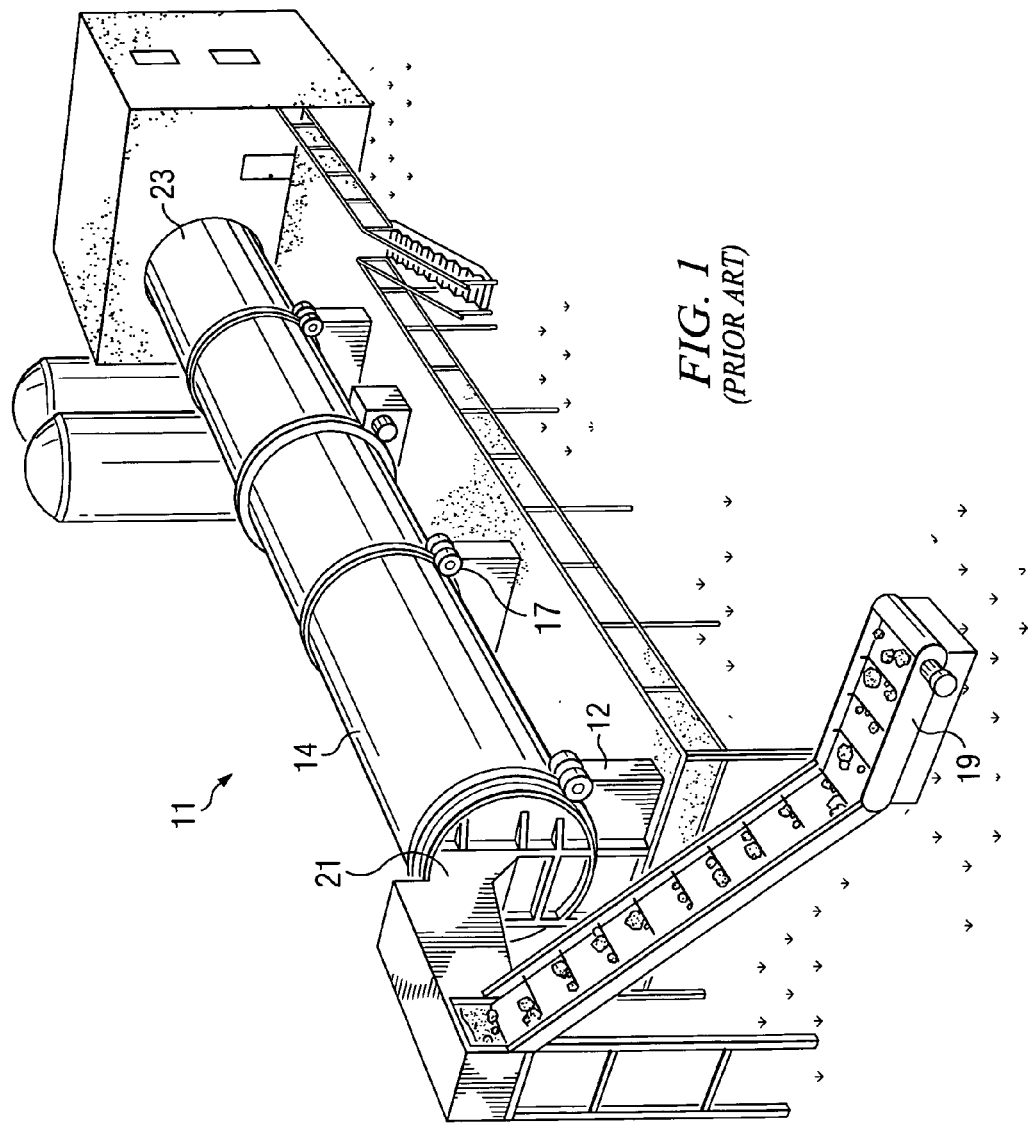
FIG. 1 is a perspective view of a straight rotary kiln.

FIG. 1 shows a traditional straight rotary lime kiln, designated generally as 11. Conventional rotary kilns of the type shown typically have a diameter to length ratio of about 1:30-40 with lengths of 75-500 feet and diameters of 4-11 feet being typical. See Boynton, "Chemistry and Technology of Lime and Limestone", Wiley-Interscience, 2 Ed., pages 254-255. Such kilns are installed at a slight incline, generally about 3-5 degrees, as on foundation piers 12, allowing the kiln to rotate on trunnions 17 at each pier. The rotation speed of the kiln is adjustable through the use of, e.g., with variable speed drives, with the typical kiln revolving at a rate of about 35-80 revolutions per hour.

Kilns are typically lined with about 6 to 10 inches of refractory brick, plus some insulation and are encased in a shell 14 of heavy steel boiler plate that has been welded in sections. Limestone is charged into the kiln at the elevated, inlet end 21 from a storage silo or conveyor feed and quicklime is discharged at an outlet or lower end 23, moving countercurrent to the flow of combustion gases, derived from fuel injected at the lower end. Such kilns are typically charged with only a maximum of about 10% limestone so that about 90% of the interior kiln space is confined to the flame and hot gases.

A variety of different types of fuel can be employed with rotary kilns, such as petroleum coke, coal tar from coke ovens, and waste gaseous carbon monoxide from steel and chemical plants. Pulverized coal is perhaps the leading fuel for rotary kilns in the United States. All coal burning rotary plants generally maintain their own pulverization equipment attached to each kiln. Finally divided pulverized coal of about 75% passing a number 200 3 mesh screen is typically used as the fuel source. In the example shown in FIG. 1, the raw limestone feed is fed by means of a conveyor 19 to the inlet end 21 of the rotatable chamber with product being discharged through the outlet end 23 adjacent the heat source (not shown).

Figure 4:
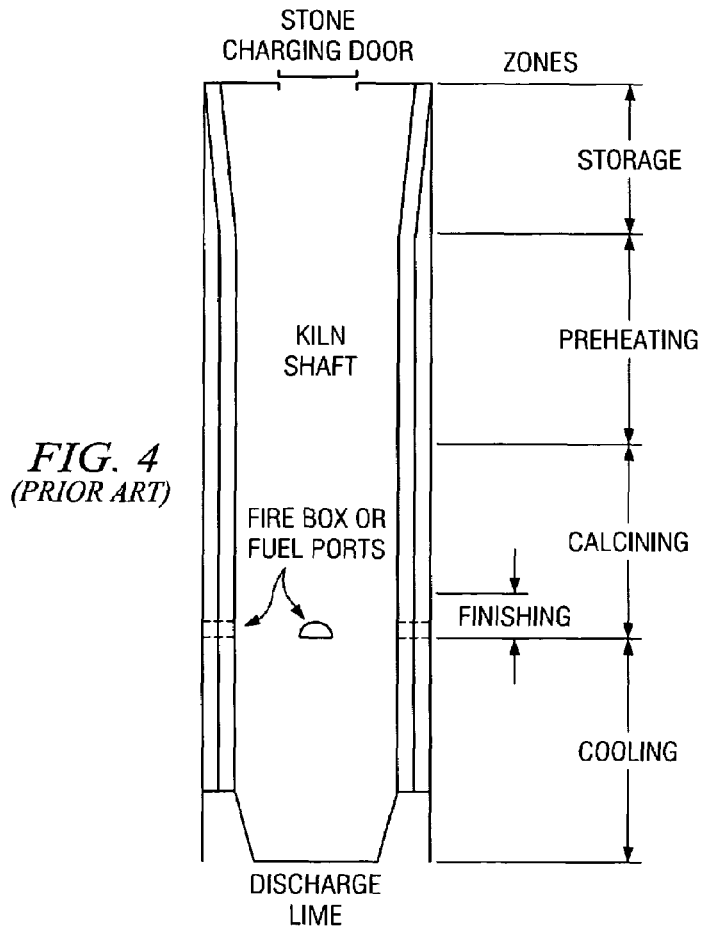
FIG. 4 is a schematic representation of the various process zones in a vertical mineral kiln such as the kiln of FIG. 3.
Figure 3:
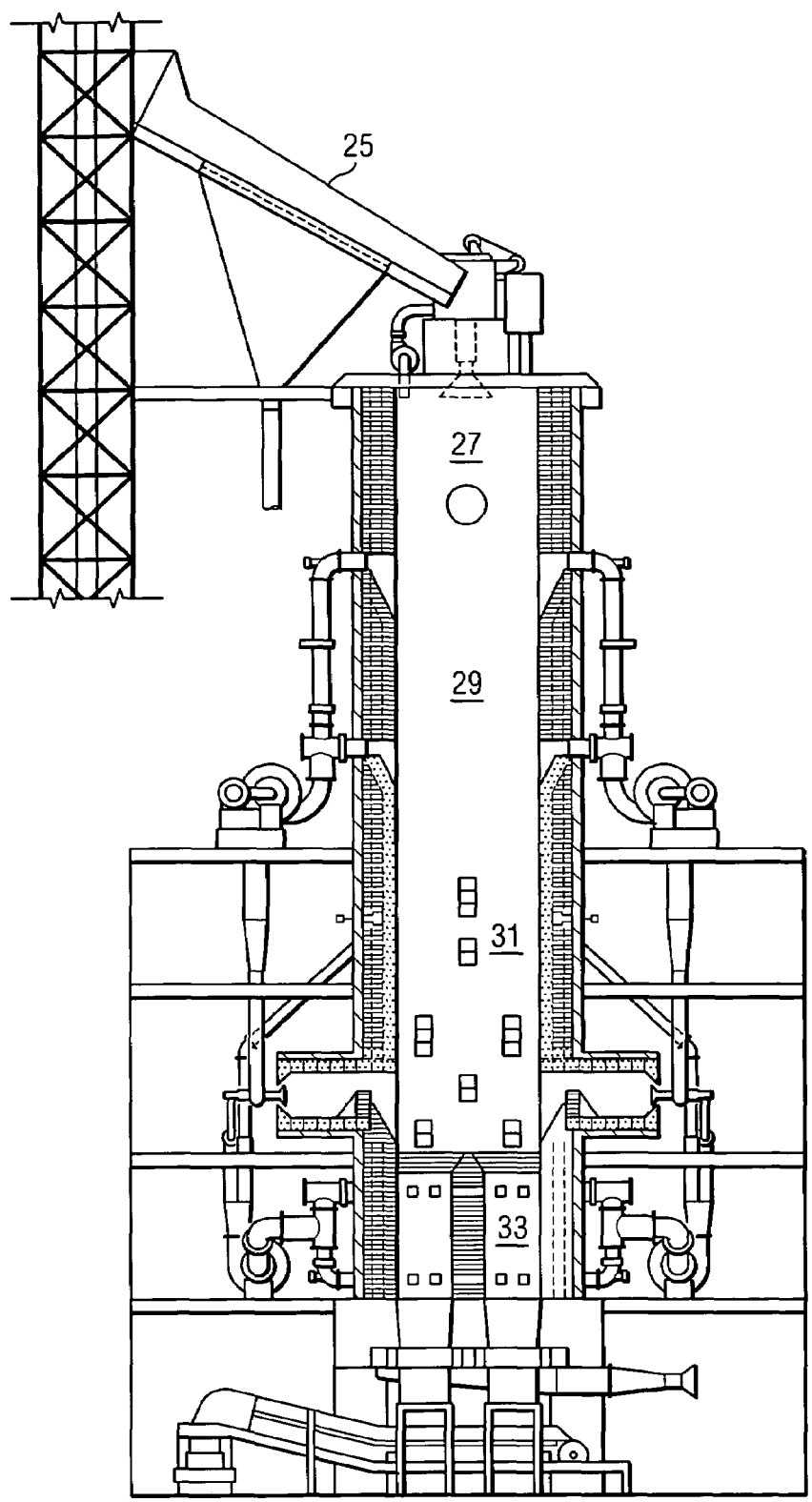
FIG. 3 is a simplified, side view of a traditional vertical kiln, shown partially in section.

Another type of kiln which is widely used at the present time is the so-called vertical kiln illustrated in FIGS. 3 and 4. In the case of a vertical kiln, such as the kiln illustrated in FIG. 3, the limestone is discharged from a conveyor 25 into a feed or storage chamber 27. The stone then passes downwardly through a preheat chamber 29 to a calcining chamber 31, and then to a cooling chamber 33 before being discharged as quicklime. The various processing zones of the vertical kiln are illustrated schematically in FIG. 4. The four zones from top to bottom, in sequence, are (1) stone storage, a vertical or often a modified hopper-shaped zone;

(2)preheating zone, designed to heat the stone near dissociation temperatures; (3) calcining zone, where combustion occurs and $CO_2$ is removed from the stone; and (4) cooling and discharge zone, usually shaped like an inverted, truncated cone, at the bottom of which the lime is discharged.

Figure 5:
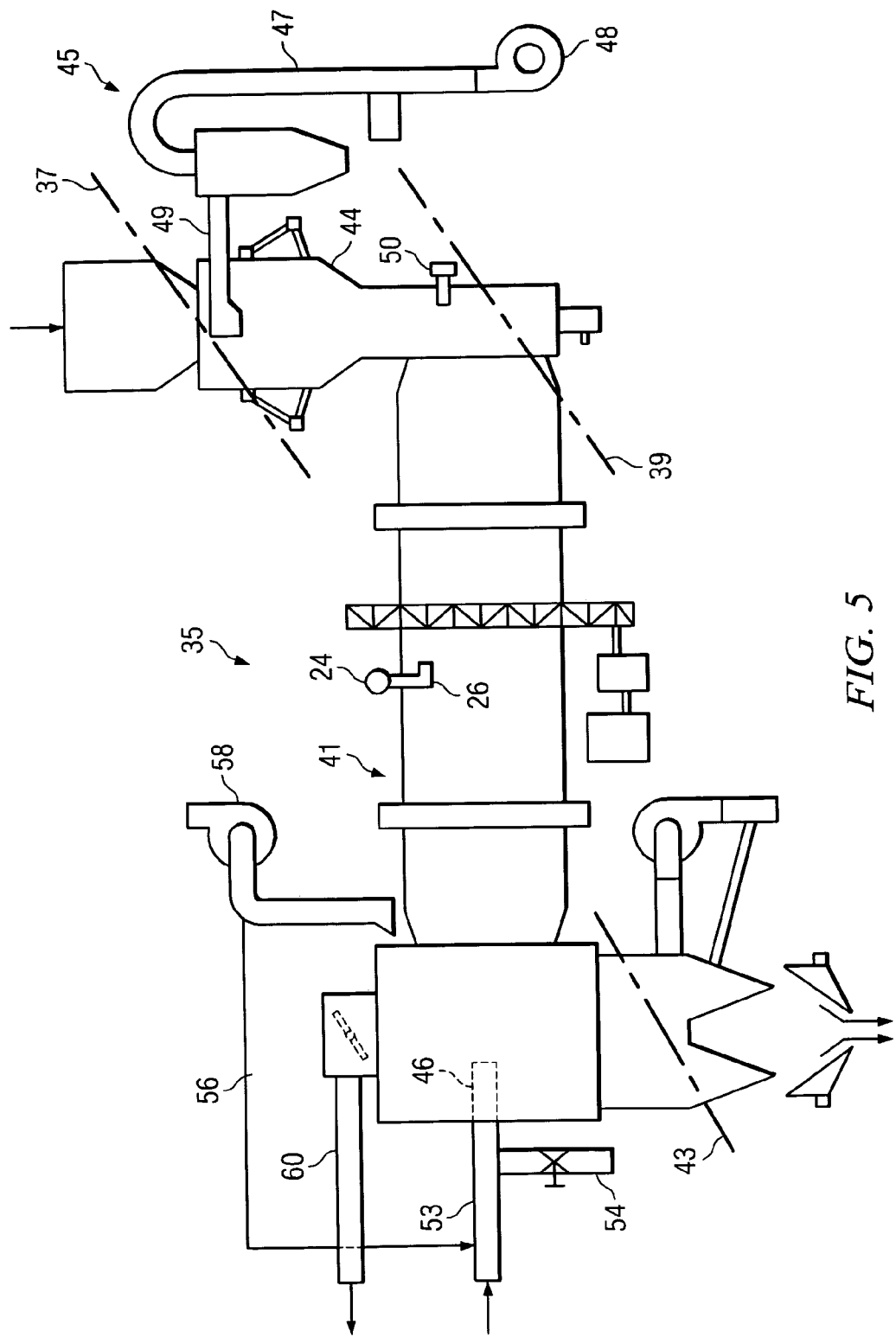
FIG. 5 is a schematic illustration of rotary preheater kiln employing the method of the present invention.

FIG. 5 illustrates, in schematic fashion, another type of lime kiln 35 known as the "rotary preheater limestone kiln." It is toward this particular type of mineral processing kiln that the present invention is chiefly directed, primarily because of the ease or convenience allowed in injecting the chemical additive. The rotary preheater kiln can also be analogized as having four primary treatment zones, namely a feed zone (generally the region above imaginary line 37), a preheat zone (generally the region above imaginary line 39), a calcination zone (shown generally as 41 in FIG. 5) and a cooling and discharge zone (generally below imaginary line 43). The feed zone 37 is the location at which the raw limestone enters the kiln, and is located directly above the preheat zone 39. The preheat zone 39, in turn, communicates with an upper end of the calcination zone 41.

The preheat zone 39 includes the vertical shaft 44 with its associated limestone preheater equipment 45 attached thereto. The purpose of the preheater zone 39 is to remove heat from the exhaust air leaving the kiln at the lower end of the calcining zone 41, while at the same time preheating the stone before it reaches the upper end of the calcination zone. The presence of the preheater equipment 45 generally allows the length of the kiln to be shortened, as well as allowing a higher operating efficiency to be achieved. The preheater 45 has a heat supply duct 47 that is connected through suitable ductwork or piping 49 towards the top of the vertical shaft 44, directly below the feed zone 37. The piping 49 that connects the limestone preheater equipment 45 to the vertical shaft 44 communicates with the heated exhaust from the lower end of the calcination zone 41, the exhaust being routed by a fan 48. The exhaust gas being introduced at point 49 in FIG. 5 is generally in the temperature range of about 450° F.-550° F. (232-288° C.). However, the temperature in the preheat zone (between imaginary lines 37 and 39) eventually ranges from about 1920° F.-2000° F. (1049-1093° C.).

This temperature range found in the preheat zone of the rotary preheater kiln falls within the relatively narrow temperature window needed to obtain the maximum $NO_x$ reduction with the minimum $NH_3$ "slip." As has been mentioned briefly, the design of the traditional straight rotary shaft kiln and the design of the vertical kiln are not well adapted for injection of the chemical additive. This is due to the fact that the optimum temperature condition for the injection of the nitrogen-containing chemical additive is in the middle of the kilns, making it difficult to locate a suitable injection duct. In the rotary preheater kiln, the optimum temperature conditions exist just before the primary calcining zone as the combustion gases go into the preheater to heat up the limestone feed.

Continuing with the description of the typical rotary preheater kiln, the calcination zone 41 is located at the lower end of the inclined rotary vessel and includes a primary burner 46 which is fed by a combustion air inlet 53 at its lower end. Fuel gases are introduced through the fuel supply duct 54. A source of combustion air 56 is supplied from the blower 58. The exhaust duct 60 supplies hot exhaust gases to the preheater 45.

The calcination zone 41 has an upper end which receives the raw stone feed which passes from the preheat zone 39 and a lower end. The stone at the elevated end of the inclined rotary vessel advances toward a flame produced by the primary burner 46 located at the lower end of the inclined rotary vessel where the limestone is calcined into quicklime and discharged. The rotation of the vessel assists in breaking up the limestone and also allows a more equal heat distribution to all sides of the stone by providing a greater surface area to be available for heating. The production of quicklime requires a large amount of heat, which is generated by the use of the primary burner.

The calcination zone 41 subjects the raw limestone to very high temperatures, causing the calcium carbonate to disassociate with the resultant formation of calcium oxide. The minimum temperature for the disassociation of calcium carbonate is about 1648° F. (898° C.). However, for practical production purposes, the calcination zone 41 in the rotary preheater kiln will have temperatures varying from about 1920° F.-2500° F. (1049-1371° C.). The limestone feed entering the preheat zone 39 contacts the warm preheat gas at about 450° F.-550° F. (232-288° C.). As the limestone reaches the bottom of the preheat zone 39, the temperature of the stone has risen to about 1920° F.-2000° F. (1049-1093° C.). As the limestone advances along the length of the rotary shaft, the temperatures raise to around 2500° F. (1371° C.). Once the calcining process is complete, the resulting quicklime passes though the cooling and discharge zone 43 where a cooling air supply exiting the supply piping cools the quicklime product to around 250° F. (121° C.).

As has been briefly discussed, one improvement which has been introduced into lime kiln operations of the above described type involves the nature of the gases being liberated by the calcining operation. In contrast to the hot gases from the lower end of the calcining zone 41 associated with the primary burner, the liberated gases within the rotary vessel are much lower in temperature and often of higher molecular weight and density. As a result, these gases tend to stratify within the vessel interior, with the liberated gases tending to remain towards the bottom of the kiln. There are also combustible substances used as fuel added to the process to the mid-portion of the kiln. The liberated gases blanket and shield these combustible materials from the oxygen content in the gases at the upper levels of the kiln gas stream. This blanket of low temperature gases also shields the mineral bed from direct contact with the hot combustion gases.

Injecting turbulent air at a preselected point or points downstream of the preheat zone, such as point 24, reduces stratification of kiln gases and improves the energy efficiency of the kiln. The injection piping can be connected directly to a blower or fan for delivery of high velocity and high energy air into the kiln gas stream. The resulting rotational component supplied by the injected air causes the hot gases that were traveling along the top of the kiln to be forced downward onto the calcining limestone, thus pushing up the blanket of cool liberated gases.

Preferably, air is injected into the rotary vessel at a velocity of about 100 to about 1000 feet per second, typically from an air pressurizing source providing a static pressure of greater than about 0.10 atmospheres. The injection point is preferably located at a point along the lower one-half length of the rotary vessel, where the temperature difference between the kiln gases and the mineral are the greatest, to mix the gas released from the mineral with combustion gases from the primary burner. Preferably the mass flow rate of the injected air is about 1 to about 15% of the mass rate of use of combustion air by the kiln.

In the example illustrated schematically in FIG. 5, air is injected into the rotary vessel through an air injection tube 26 extending from a port in the rotary vessel wall into the rotary vessel and terminating in a nozzle for directing the injected air along a predetermined path in the rotary vessel. Typically air is injected into the rotary vessel through two or more nozzles positioned in the rotary vessel. The path of the injected air is selected so as to impart rotational momentum to the combustion gases flowing through the rotary vessel.

The injection tube is formed to communicate with a source of pressurized air, preferably a fan, blower, or compressor capable of providing a static pressure differential of greater than about 0.10 atmospheres, preferably greater than about 0.20 atmospheres. The fan, blower, or compressor is sized and powered sufficiently to deliver injected air continuously into the kiln. The size of the orifice of the air injection nozzles are selected so that the mass flow rate of injected air at the applied static pressure is about 1 to about 15%, more preferably about 1 to about 10% into the rotary vessel. The linear velocity of the injected air typically ranges from about 100 feet per second to about 1000 feet per second. A controller is provided for the fan or compressor to adjust the rate of air injection into the kiln at the downstream air injection point. A general discussion of the techniques of turbulent air injection in mineral processing kilns can be found in U.S. Pat. No. 6,672,865, issued Jan. 6, 2004, to Hansen et al., and similar references.

As has been mentioned, the present invention, in addition to employing the general principal of turbulent air injection, also employs an additional technique for reducing $NO_x$ emissions by injecting a nitrogen containing chemical additive, such as ammonia or ammonia precursors. The preferred source of ammonia or ammonia precursor is any conveniently available source of supply, and is preferably selected from the group consisting of urea, ammonia and cyanuric acid. It is accordingly the general object of the present invention to provide a method to further enhance $NO_x$ reduction by coupling the temperature control and gas composition uniformity afforded by the high temperature mixing described above with the use of chemical reducing agents within an optimal temperature window.

The general principles of introducing ammonia-containing additives into the calcination zone of fine grained materials are taught in such references as U.S. Pat. No. 6,544,032, issued Apr. 8, 2003; U.S. Pat. No. 5,919,301. However, these references were not directed specifically toward lime kiln operation, or to preheater type lime kiln design. As has been briefly discussed, the ammonia or ammonia precursor is most effective at enhancing $NO_x$ reduction in a rotary preheater lime kiln when injected at a specific optimum location and temperature point in the rotary preheater kiln. Unlike the straight rotary shaft kiln and the vertical shaft kiln, the rotary preheater kiln has access to the preferred optimum temperature range for injection of 1600° F.-2200° F. (871-1204° C.) at a location away from the center of the kiln.

Figure 2:
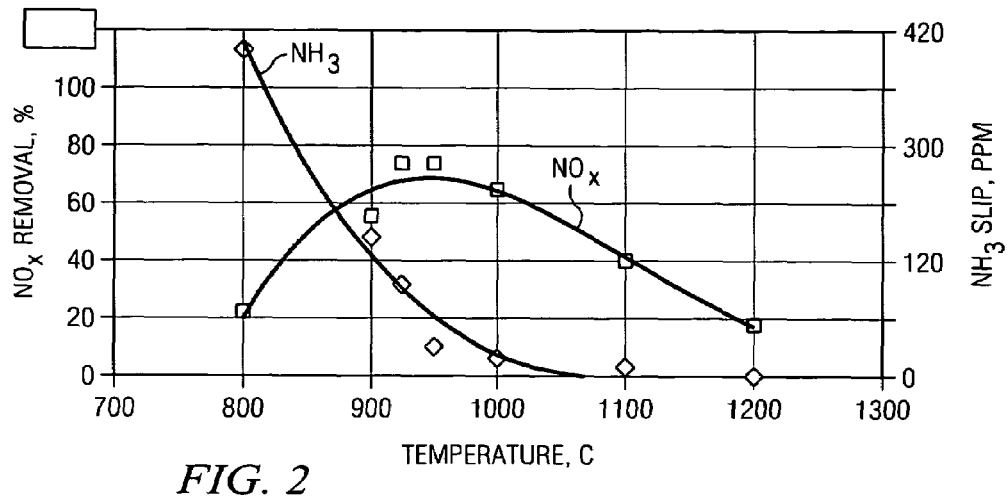
FIG. 2 is a graph showing the effect of ammonia injection on $NO_x$ emissions in a rotary kiln.

Because of the presence of the preheater section in this particular type of kiln design, injection of the chemical additive can occur at an optimal temperature between the zones where the combustion gases from the calcining zone pass into the preheater zone to heat up the limestone feed. FIG. 2 is a graphical representation of the preferred temperature window for $NO_x$ emission control through the injection of urea illustrating the percentage of ammonia "slip." As will be appreciated from the graph, the preferred temperature window is in the approximate range of 1600 to 2200° F. (871-1204° C.), most preferably about 1920-2600° F. (1049-1093° C.). As shown in schematic fashion in FIG. 5, the preferred injection point is in the vertical shaft region at the bottom of the preheat region in the general vicinity of the upper end of the calcining zone.

The injection of the ammonia or ammonia precursors can be introduced through suitable ductwork, such as the ductwork 50 shown in FIG. 5, provided at the preselected optimum temperature window location. The chemical additive can be introduced at this point, as by blowing the dry additive though the ductwork 50 with a suitable fan or blower. Alternatively, the ammonia or ammonia precursor might, in some instances, be provided as a liquid solution which is introduced through a nozzle into the kiln.

The present invention presents a number of advantages over the present practices in the lime kiln processing arts. The present invention provides a more economical procedure for the reduction of $NO_x$ than a stand alone selective non catalytic reduction system. By introducing urea into the process at an optimal point in the process and at an optimal temperature, the limestone being calcined will receive all of the benefit of the introduction of urea without the expensive equipment needed for a selective non catalytic reduction system. The process of the invention uses principles of two different $NO_x$ reduction technologies found in mineral processing generally, but applies these principles to the specific field of rotary preheater limestone kilns. Because of the specific nature of the design of the rotary preheater kiln, the present method is able to obtain the optimum benefit of chemical additive injection, along with the added benefit of turbulent air injection to maximize to the greatest extent possible the reduction in undesirable $NO_x$ emissions.

While the invention has been shown in only one of its forms, it is not thus limited but is susceptible to various changes and modifications without departing from the spirit thereof.

What is claimed is:

1. A method of reducing NOx emissions in a rotary preheater limestone kiln having a feed zone, a preheat zone, a calcining zone and a cooling and discharge zone, the method comprising the steps of:

feeding a supply of limestone to the feed zone;
    moving the limestone through the preheat zone having a preheat temperature range, to an upper end of the calcining zone where the limestone is heated to a temperature and for a time sufficient to convert the limestone to quicklime;
    introducing a source of ammonia or an ammonia precursor at a point where the temperature in the kiln is within an optimum temperature range to obtain maximum $NO_x$ reduction with minimum $NH_3$ slip;
    injecting turbulent air at preselected point or points downstream of the preheat zone to reduce stratification of kiln gases and improve the energy efficiency of the kiln;
    passing the calcined limestone from the calcining zone to the cooling and discharge zone and discharging the resulting quicklime from the kiln.

2. The method of claim 1, wherein the source of ammonia or ammonia precursor is selected from the group consisting of urea, ammonia and cyanuric acid.

3. The method of claim 1, wherein the predetermined optimum temperature point is a point between the preheat zone and a primary region of the calcining zone where the combustion gases from the calcining zone go into the preheater zone to heat up the limestone feed, the predetermined optimum temperature at that point being in the range from about 1600 to 2200° F.

4. The method of claim 3, wherein the calcining zone has a calcining temperature in the range from about 2200 to 2500° F. and wherein preheat gases are introduced into the preheat zone at a temperature range from about 450 to 550° F.

5. The method of claim 4, wherein the ammonia or ammonia precursor is a dry powder which is blown into the kiln through ductwork.

6. The method of claim 4, wherein the ammonia or ammonia precursor is liquid solution which is introduced through a nozzle into the kiln.

7. The method of claim 1, wherein the kiln includes an inclined rotary vessel having an upper end and lower end, a preheating assembly positioned proximate to the upper end of the rotary vessel and a burner positioned proximate to a combustion air inlet at the lower end of the rotary vessel.

8. The method of claim 1, wherein the step of moving the limestone through calcining zone liberates $CO_2$ from the limestone to convert the limestone to quicklime.

9. A method of reducing NOx emissions in a rotary preheater limestone kiln having a feed zone, a preheat zone, a calcining zone and a cooling and discharge zone, the method comprising the steps of:

feeding a supply of limestone to the feed zone;

moving the limestone through the preheat zone having a preheat temperature range resulting from the circulation of hot gases from the calcining zone to the preheat zone, the preheated limestone being passed to an upper end of the calcining zone where the limestone is heated to a temperature and for a time sufficient to convert the limestone to quicklime;

introducing a source of ammonia or an ammonia precursor into the limestone upstream of the primary region of the calcining zone at a point where the kiln temperature is generally in the preheat temperature range from about 1600 to 2200° F;

injecting turbulent air at preselected point or points downstream of the preheat zone to reduce stratification of kiln gases and improve the energy efficiency of the kiln;

passing the calcined limestone from the calcining zone to the cooling and discharge zone and discharging the resulting quicklime from the kiln.

* * * * *